United States Patent [19]
Morris et al.

[11] 3,913,256
[45] Oct. 21, 1975

[54] ILLUMINATED FISHING FLOAT APPARATUS

[75] Inventors: Earl F. Morris, Moore; Jimmy L. Croft, Midwest City, both of Okla.

[73] Assignee: Earl F. Morris, Moore, Okla.

[22] Filed: Dec. 17, 1973

[21] Appl. No.: 424,941

[52] U.S. Cl. .............................. 43/17.5; 43/44.95
[51] Int. Cl.² ........................................ A01K 93/00
[58] Field of Search ..... 43/17.5, 17.6, 43.14, 44.93, 43/44.95

[56] References Cited
UNITED STATES PATENTS

| | | | |
|---|---|---|---|
| 2,197,372 | 4/1940 | Bailey | 43/17.6 |
| 2,527,956 | 10/1950 | Peevey | 43/17.5 |
| 2,536,408 | 1/1951 | Addicks | 43/17.5 |
| 2,587,311 | 2/1952 | Golnick | 43/44.93 |
| 3,041,771 | 7/1962 | Hreno | 43/17.5 |
| 3,721,033 | 3/1973 | Haynes | 43/17.6 |

*Primary Examiner*—Warner H. Camp
*Attorney, Agent, or Firm*—Dunlap & Codding

[57] ABSTRACT

An improved fishing float floatable in a body of water or the like, having a hollow first and a second body section removably connectable for forming a spherically shaped float body, the first body section being formed of a light emitting material and a light and electrical power source being supported in the hollow portion of the second body section. A plate is connected to the second body section and a reflector is secured to the plate, the light from the light and the light reflected from the reflector being emitted through the first body section in a lighted position of the light. The fishing float also includes removable rings for securing the fishing line to the float body and a seal for forming a substantially fluidtight seal between the first and the second body sections in a connected position.

1 Claim, 4 Drawing Figures

ILLUMINATED FISHING FLOAT APPARATUS

BACKGROUND OF THE INVENTION

1. Field of the Invention

The present invention generally contemplates an improved fishing float and, more particularly, but not by way of limitation, an improved spherically shaped, illuminated fishing float having a reflector for facilitating the radiation and dispersion of the light through a portion of the float body.

2. Brief Description of the Prior Art

In the past various devices have been constructed for providing a lighted type of fishing lure or fishing plug or the like. An illuminated fishing lure was disclosed in the U.S. Pat. No. 2,431,420, issued to Pope, wherein a cylindrically shaped casing was inserted through a central portion of a spherically shaped float, the casing having one light bulb disposed on each end and shaped to accommodate a battery type of power source. A pair of fish hooks extended from one end of the casing. A similar illuminated type of fishing float was disclosed in the U.S. Pat. No. 2,236,215, issued to Klinitski.

A signal light type of signaling device was disclosed in U.S. Pat. No. 2,587,223, issued to Robinson, wherein a light bulb was supported in a cylindrically shaped casing, the light bulb being covered via a plastic globe or cover for emitting light provided by the light bulb. The fishing line was attached to the signal light in such a manner that a tension or pull on the line caused by the nibbling or bite of a fish would result in the illumination of the light.

A fishing bob was disclosed in the U.S. Pat. No. 2,260,059, issued to Sears. The fishing bob disclosed via this patent was constructed such that when a fish pulled on the end of the line, air was exhausted from an air chamber through orifices causing a whistle indicating a fish had bitten the hook. The fishing line was secured to the bob via rings which were slidably disposed about portions of the fishing bob shell.

A spherically shaped fishing bob was also disclosed in the U.S. Pat. No. 3,041,771, issued to Hreno, this bob being constructed utilizing two hemispherically shaped shells with a light support secured in one of the hemispherically shaped shells. The U.S. Pat. Nos.: 2,527,956, issued to Peevey; 2,205,352, issued to Fisher; and the G.B. Pat. Nos.: 1,082,095, issued to Dickens; and 1,162,925, issued to Le-Aston Tool Co. (Ealing) Limited, also disclosed illuminated types of fishing lure or float constructions.

SUMMARY OF THE INVENTION

An object of the invention is to provide an illuminated type of fishing float wherein light from a light source is utilized to illuminate a portion in a more efficient and effective manner.

Another object of the invention is to provide an illuminated fishing float wherein the light emitted through a translucent portion is more evenly distributed providing a more effective illumination.

One other object of the invention is to provide an illuminated fishing float which is more efficient and economical in the construction and the operation thereof.

Other objects and advantages of the invention will be evident from the following detailed description when read in conjunction with the accompanying drawing illustrating one preferred embodiment of the invention.

DESCRIPTION OF THE PREFERRED EMBODIMENT

Figure 1:
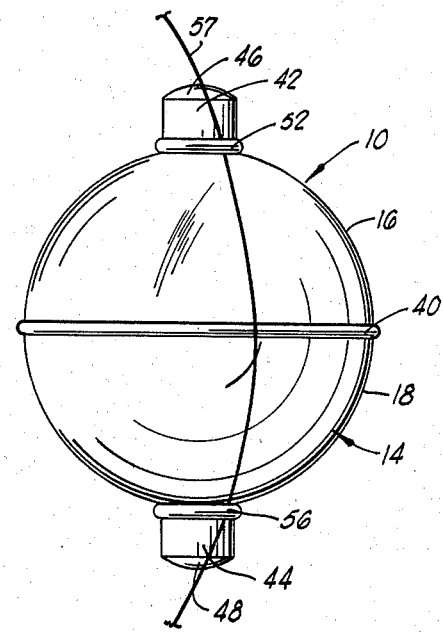
FIG. 1 is a typical side elevational view of an illuminated fishing float constructed in accordance with the present invention.
Figure 2:
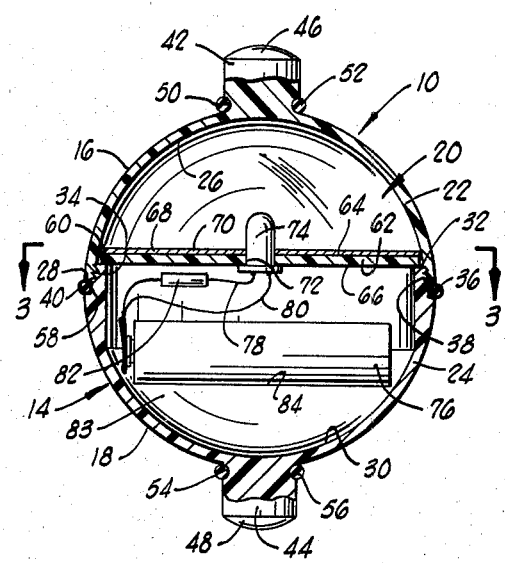
FIG. 2 is a cross-sectional view of the illuminated fishing float of FIG. 1, diagrammatically showing the light source and the electrical power source disposed within a portion of the fishing float.
Figure 3:
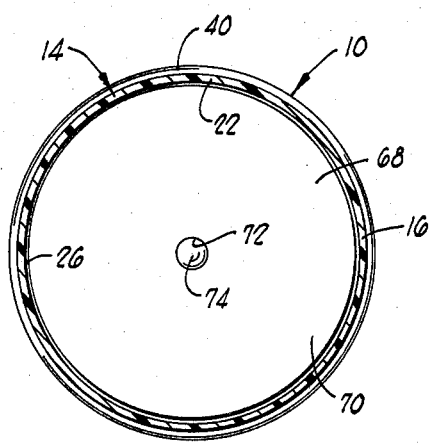
FIG. 3 is a cross-sectional view of the fishing float of FIGS. 1 and 2, taken substantially along the lines 3—3 of FIG. 2.

Referring to the drawings in general and to FIGS. 1, 2 and 3 in particular, shown therein and designated by the general reference numeral 10 is a fishing float constructed in accordance with the present invention. The fishing float 10 generally includes a spherically shaped float body 14 having an upper section 16, a lower section 18 and a hollow portion 20 formed within a portion of the float body 14. The upper section 16 is constructed of a translucent, light emitting material, and the hollow portion 20 of the float body 14 communicates with the light emitting upper section 16 portion of the float body 14 in an assembled position. The fishing float 10 is constructed such that the fishing float 10 is floatable in a body of water or the like (not shown), and the light illuminating portion of the upper section 16 is illuminated via a light source disposed within the hollow portion 20, in a manner to be described in greater detail below.

The float body 14 is, in a preferred form, spherically shaped and includes a hemispherically shaped first body section 22 and a hemispherically shaped second body section 24, as shown more clearly in FIG. 2. The first body section 22 includes a hollow portion 26 intersecting the end 28 of the first body section 22, and the second body section 24 includes a hollow portion 30 intersecting the end 32 of the second body section 24. A portion of the inner peripheral surface of the first body section 22, generally near the end 28 thereof, is threaded, the threaded portion of the first body section 22 being designated via the general reference numeral 34 in FIG. 2. An annular recess 36 is formed about a portion of the outer peripheral surface of the second body section 24 intersecting the end 32 thereof, and a portion of the outer peripheral surface of the second body section 24 formed via the annular recess 36 is threaded, the threaded portion of the second body section 24 being designated in FIG. 2 via the general reference numeral 38.

In an assembled position, the first body section 22 is joined to the second body section 24 via the threaded engagement between the threaded portion 34 of the first body section 22 and the threaded portion 38 of the second body section 24, as shown in FIG. 2. A portion of the first body section 22, generally adjacent the end 28 thereof, is disposed generally within the annular recess 36 of the second body section 24, and the outer peripheral surface of the first body section 22 is generally aligned with the outer peripheral surface of the second body section 24, the outer peripheral surfaces of the first body section 22 and the second body section 24 combining to form the spherically shaped outer peripheral surface of the float body 14 in an assembled position of the first and the second body sections 22 and 24.

In a preferred form and in an assembled position of the first and the second body sections 22 and 24, the end 28 of the first body section 22 is spaced a distance from the annular surface formed via a portion of the annular recess 36 in the second body section 22, and a portion of an annular O-ring type of seal member 40 is disposed generally within the annular space between the first and the second body sections 22 and 24. In one preferred form, the O-ring 40 is disposed within the annular recess 36 of the second body section 24, and the first body section 22 is then threadedly connected to the second body section 24 to a position wherein the end 28 of the first body section 22 compressingly engages a portion of the O-ring 40 compressing the O-ring 40 between the first and the second body sections 22 and 24. The first and the second body sections 22 and 24 are thus removably connectable via the threaded portions 34 and 38 and the O-ring 40 provides a substantially water- or fluidtight seal between the first and the second body sections 22 and 24 in the assembled position of the float body 14, the hollow portion 26 of the first body section 22 and the hollow portion 30 of the second body section 24 combining to form the hollow portion 20 of the float body 14 in the assembled position of the first and the second body sections 22 and 24.

A first protrusion 42 is formed on a portion of the outer peripheral surface of the first body section 22, the protrusion 42 extending at a distance radially from the outer peripheral surface of the first body section 22. A second protrusion 44 is formed on the outer peripheral surface of the second body section 24, the second protrusion 44 extending a distance radially from the outer peripheral surface of the second body section 24. In one preferred form, the first protrusion 42 is positioned on the outer peripheral surface of the first body section 22 and the second protrusion 44 is positioned on the outer peripheral surface of the second body section 24 such that, in an assembled position of the first and second body sections 22 and 24, the second protrusion 44 is generally aligned with and oriented 180° from the first protrusion 42, as shown more clearly in FIGS. 1 and 2. It should also be noted that, in a preferred form, the first and the second protrusions 42 and 44 are each generally cylindrically shaped, each protrusion 42 and 44 having a rounded outermost end portion (the rounded outer end portion of the first protrusion 42 being designated via the reference numeral 46 and the rounded outermost end portion of the second protrusion 44 being designated via the reference numeral 48 in FIGS. 1 and 2).

In one preferred form, the first protrusion 42 is formed integrally with the first body section 22, and the second protrusion 44 is formed integrally with the second body section 24. An annular recess 50 is formed about a portion of the first protrusion 42, generally adjacent the connection of the first protrusion 42 to the outer peripheral surface of the first body section 22, and an O-ring 52 is removably disposed within the annular recess 50, the O-ring 52 being sometimes referred to below simply as the ring 52. An annular recess 54 formed about a portion of the second protrusion 44, generally adjacent the connection of the second protrusion 44 to the outer peripheral surface of the second body section 24, and an O-ring 56 is removably disposed within the annular recess 54, the O-ring 56 being sometimes referred to below simply as the ring 56. Thus, the ring 52 is removably secured about a portion of the first protrusion 42, and the ring 56 is removably secured about a portion of the second protrusion 44.

During the operation of the illuminated fishing float 10, a fishing line or the like (a fragmentary portion of a fishing line being shown in FIG. 1 and designated therein via the general reference numeral 57) is removably secured to the float body 14 via the rings 52 and 56. To secure the line 57 to the float body 14, the rings 52 and 56 are each removed and a portion of the line 57 is threaded through the ring 52 and through the ring 56. In this position of the line 57, the ring 52 is inserted over the rounded end 46 and moved downwardly about the first protrusion 44 to a position securing the ring 52 in the annular recess 50 and disposing a portion of the line 60 generally between the ring 52 and the adjacent portion of the first protrusion 42 thereby securing a portion of the line 57 to the float body 14. The ring 56 is inserted over the rounded end 48 portion of the second protrusion 44 and moved downwardly to an assembled position generally within the annular recess 54 thereby securing a portion of the line 57 generally between the ring 56 and the adjacent portion of the second protrusion 44. The rings 52 and 56 thus each cooperate to removably secure portions of the line 57 of the float body 14 in such a manner that the line 57 can be quickly and easily secured to or disassembled from the float body 14 during the operation of the fishing float 10.

As shown more clearly in FIG. 2, an annular portion 58 of the second body section 24, generally near the end 32 thereof, has an increased thickness as compared to the remaining portion of the second body section 24 such that in an assembled position of the first and the second body sections 22 and 24 a portion of the end 32 of the second body section 24 extends radially inwardly into the hollow portion 20, the annular radially inwardly extending portion of the end 32 forming an annular upwardly facing ledge 60 disposed within the hollow portion 20 of the float body 14. A circular plate 62 is disposed in the hollow portion 20 of the float body 14, the plate having an upper surface 64 and a lower surface 66. A portion of the lower surface 66 of the plate 62, generally adjacent the outer periphery, is disposed on the ledge 60 formed via the end 32 of the second body section 24, the ledge 60 portion of the second body section 24 supporting the plate 62 in an assembled position disposed and supported within the hollow portion 20 of the float body 14. Thus, the plate 62 is connected to a portion of the float body 14 via the engagement between the ledge 60 and a portion of the inner peripheral surface of the first body section 22, as shown in FIG. 2.

A reflector 68 constructed of a light-reflecting material having a reflector surface 70 is disposed within a portion of the hollow portion 20 of the float body 14 and, more particularly, the reflector 70 is connected to the upper surface 64 of the plate 62 such as by an adhesive or the like, for example. The reflector 68 is supported and positioned within the hollow portion 20 of the float body 14 to reflect and disperse light through the light emitting portion of the first body section 22 during the operation of the fishing float 10.

An opening 72 is formed through a central portion of the plate 62 and through a central portion of the reflector 68 and a light 74 such as, in a preferred form, a light emitting diode, for example, is disposed through the opening 72 and secured to the plate 62, the plate 62 supporting the light 74 in an assembled position such that the light emitting portion of the light 74 extends generally above the upper surface 64 of the plate 62 and is disposed within a portion of the hollow portion 26 of the first body section 22. The portion of the light 74 disposed within the hollow portion 26 of the first body section 22 is also disposed above the reflector surface 70 of the reflector 68 such that light emitted via the light 74 is emitted through the light emitting first body section 22 and a portion of the light emitted via the light 74 is reflected from the reflector surface 70 and subsequently emitted through the light emitting portion of the first body section 22 during the operation of the fishing float 10.

Figure 4:
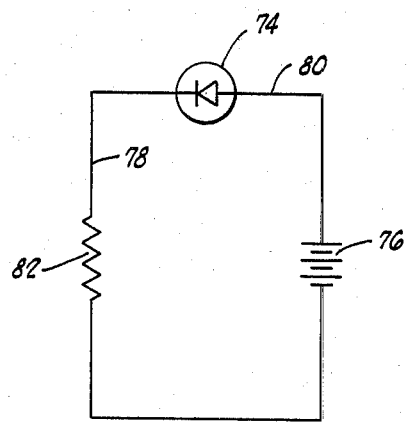
FIG. 4 is a schematic view showing the connection between the light source and the electrical power source of the illuminated fishing float of FIGS. 1, 2 and 3.

The light 74 is schematically shown in FIG. 4 and is connected to an electrical power source 76 for energizing the light 74, such as a battery or the like, for example, the light 74 being connected to the electrical power source 76 via conductors 78 and 80. In one preferred form, the electrical power source 74 is an "N" type battery which cooperates to provide a relatively small size and lightweight fishing float 10 and it has been found convenient to utilize two batteries connected in series. A current limiting resistor 82 is interposed in the conductor 78, generally between the electrical power source 76 and the light 74, limiting the current connected to the light 74 via the electrical power source 76. The light 74 has a lighted position and, in the lighted position of the light 74, the light 74 is connected to the electrical power source 76 via the conductors 78 and 80 thereby illuminating the upper section 16 of the float body 14 via the light emitted from the light 74 and the light dispersed and reflected via the reflector surface 70 of the reflector 68.

As shown more clearly in FIG. 2, a battery support 83 is disposed in the hollow portion 30 of the second body section 24 and a recess 84 is formed in a portion of the battery support 83, the battery support 83 being secured to a portion of the inner peripheral surface of the second body section 24. In an assembled position of the fishing float 10, a portion of the battery-type electrical power source 76 is disposed generally within the recess 84 and supported in an assembled position within a portion of the hollow portion 30 of the second body section 24 via the battery support 83.

To assemble the fishing float 10, the battery support 83 is initially disposed within the hollow portion 30 of the second body section 24 and secured in the assembled position, as shown in FIG. 2. The battery type electrical power source 76 is then disposed within the recess 84 and secured to the adjacent portions of the battery suport 83, the light source 74 being then connected to the battery type electrical power source 76 via the conductors 78 and 80 and the current limiting resistor 82. The light source 74 is then disposed through the opening 72 formed through the plate 62 and the reflector 68 and secured in that position to an adjacent portion of the plate 62. The plate 62 is then disposed over the opening formed through the second body section 24 via the hollow portion 30 and supported on the upwardly facing ledge 60, the plate 62 being sized to encompass substantially all of the opening formed via the hollow portion 30, generally adjacent the end 32 of the second body section 24, thereby enclosing the electrical power source 76, the conductors 78 and 80 and the current limiting resistor 82 generally within the hollow portion 30 of the second body section 24.

After the plate 62 has been disposed on the upwardly facing ledge 60 of the second body section 24, the ring 40 is then disposed within the annular recess 36, and the first body section 22 is threadedly secured to the second body section 24 via the threaded engagement between the threaded portions 34 and 38. In the assembled position of the first and second body sections 22 and 24, the ring 40 forms a water seal for substantially preventing water from leaking into the hollow portion 20 of the float body 14, and a portion of the inner peripheral surface of the first body section 22 engages a portion of the plate 62 and the reflector 68 thereby securing the plate 62 and the reflector 68 in an assembled position supported within the hollow portion 20 of the float body 14. The light 74 is in a lighted position since it is connected to the battery type electrical power source 76, and thus the upper section 16 of the float body 14 is illuminated via the light emitted therethrough from the light 74 and the light reflected from the reflector surface 70 of the reflector 68. In a preferred form, the light emitting upper section 16 or, in other words, the first body section 22 is, more particularly, constructed of a milky light dispersing, elastomeric or plastic type of material such that the light emitting upper section 16 cooperates with the reflector 68 to disperse the light and provide a glow effect radiating from the upper section 16 of the float body 14. The circularly shaped reflector surface 70 of the reflector 68 thus cooperates to assure that substantially all of the light emitted via the light 74 is utilized to provide the glow effect radiating from the upper section 16, and the reflector surface 70 also cooperates with the upper section 16 to provide, in essence, what may be referred to as multiple secondary light sources over the entire reflector surface 70 for creating the glow effect radiating from the upper section 16, this glow effect being in contrast to a single light source visible via a transparent window or the like as found in some of the illuminated fishing floats or plugs of the type referred to before in the brief description of the prior art.

Changes may be made in the construction and the arrangement of the parts or the elements of the embodiment of the invention as disclosed herein without departing from the spirit and scope of the invention as defined in the following claims.

What is claimed is:

1. A fishing float apparatus connectable to a line and floatable in a body of water or the like, comprising:
   a hollow, spherically shaped float body, including
   a hemispherically shaped first body section constructed of light emitting material and forming the upper section of the float body, a first cylindrical protrusion being formed on a portion of the outer surface of the first body section of the float body and extending a distance therefrom;
   a hemispherically shaped second body section removably connected to the first body section and forming the lower section of the float body, a second cylindrical protrusion being formed on a portion of the outer surface of the second body section of the float body and extending a distance therefrom, the first and the second body sections being connected together and forming the hollow spherically shaped float body;

means engaging portions of the first and the second body sections generally near their connection and forming a seal substantially preventing water from leaking into the hollow portion of the float body;

an O-ring removably secured about the first protrusion, for the O-ring securing a portion of the line to the float body between the O-ring and the first protrusion in one position;

an O-ring removably secured about the second protrusion, for securing a portion of the line to the float body between the O-ring and the second protrusion in one position;

a reflector, having a reflector surface, disposed within a portion of the hollow portion of the float body;

a plate disposed in the hollow portion of the float body, having a portion connected to the float body, the reflector being connected to the plate and supported thereby with the reflector surface generally facing the light emitting portion of the upper section of the float body, the plate encompassing and enclosing a substantial portion of the hollow portion of the second body section and an aperture being formed through a portion of the plate;

a light emitting diode, having a portion disposed through the aperture in the plate and projecting into the upper section above the reflector and a portion connected to the plate and supported by the plate within the hollow portion of the float body for emitting light, when energized through the upper section of the float body and the reflector surface reflecting the light through the upper section of the float body; and means disposed in the hollow portion of the second body section and connected to the light emitting diode for energizing the light emitting diode, the plate enclosing the energizing means within the hollow portion of the second body section, said means comprising:

an electrical power source connected to the light emitting diode;

means connected to the electrical power source supporting the electrical power source in the float body hollow portion; and a current limiting resistor connected to and interposed between the electrical power source and the light emitting diode limiting the current connected to the light emitting diode.

* * * * *

UNITED STATES PATENT OFFICE
CERTIFICATE OF CORRECTION

Patent No. 3,913,256                    Dated  October 21, 1975

Inventor(s)  Earl F. Morris and Jimmy L. Croft

It is certified that error appears in the above-identified patent and that said Letters Patent are hereby corrected as shown below:

Column 6, line 31 "rather than a clear transparent type of material" should be --between material and such--.

Column 7, line 11 ."the O-ring" should not be included in this line.

Signed and Sealed this fourth Day of May 1976

[SEAL]

Attest:

RUTH C. MASON
Attesting Officer

C. MARSHALL DANN
Commissioner of Patents and Trademarks